US012646722B2

(12) United States Patent
Inoue et al.

(10) Patent No.: US 12,646,722 B2
(45) Date of Patent: Jun. 2, 2026

(54) POSITIVE ELECTRODE FOR NONAQUEOUS ELECTROLYTE SECONDARY BATTERIES, AND NONAQUEOUS ELECTROLYTE SECONDARY BATTERY

(71) Applicant: PANASONIC INTELLECTUAL PROPERTY MANAGEMENT CO., LTD., Osaka (JP)

(72) Inventors: Katsuya Inoue, Hyogo (JP); Takeshi Ogasawara, Osaka (JP); Yoshinori Aoki, Osaka (JP); Youichirou Uka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 686 days.

(21) Appl. No.: 17/926,760

(22) PCT Filed: Apr. 20, 2021

(86) PCT No.: PCT/JP2021/015958
§ 371 (c)(1),
(2) Date: Nov. 21, 2022

(87) PCT Pub. No.: WO2021/241077
PCT Pub. Date: Dec. 2, 2021

(65) Prior Publication Data
US 2023/0187653 A1 Jun. 15, 2023

(30) Foreign Application Priority Data
May 29, 2020 (JP) ................................. 2020-094168

(51) Int. Cl.
*H01M 4/66* (2006.01)
*H01M 4/505* (2010.01)
(Continued)

(52) U.S. Cl.
CPC ........... *H01M 4/666* (2013.01); *H01M 4/505* (2013.01); *H01M 4/525* (2013.01); *H01M 10/0525* (2013.01); *H01M 2004/028* (2013.01)

(58) Field of Classification Search
CPC ...... H01M 4/666; H01M 4/505; H01M 4/525; H01M 10/0525; H01M 2004/028;
(Continued)

(56) References Cited

U.S. PATENT DOCUMENTS

2009/0081548 A1* 3/2009 Nakura ............... H01M 10/052
429/231.95
2010/0248034 A1* 9/2010 Oki ....................... H01M 4/139
252/182.1
(Continued)

FOREIGN PATENT DOCUMENTS

JP H11-40154 A 2/1999
JP H1140154 * 2/1999 .............. H01M 4/58
(Continued)

OTHER PUBLICATIONS

H1140154 machine English translation (Year: 1999).*
(Continued)

*Primary Examiner* — Michael L Dignan
(74) *Attorney, Agent, or Firm* — WHDA, LLP

(57) ABSTRACT
A positive electrode for nonaqueous electrolyte secondary batteries according to the present invention is provided with a positive electrode collector and a positive electrode mixture layer that is formed on the surface of the positive electrode collector. The positive electrode mixture layer contains at least carbon fibers and a positive electrode active material that contains a lithium transition metal composite oxide; and the lithium transition metal composite oxide has a layered rock salt structure, while containing at least Ni, Al and Ca, but not substantially containing Co.

12 Claims, 1 Drawing Sheet

(51) Int. Cl.
 *H01M 4/525* (2010.01)
 *H01M 10/0525* (2010.01)
 *H01M 4/02* (2006.01)

(58) Field of Classification Search
 CPC ...... H01M 4/624; H01M 4/625; H01M 4/131;
  C01P 2002/60; C01P 2004/61; C01P
  2006/21; C01P 2006/40; C01G 53/40;
  C01G 53/50; Y02E 60/10
 See application file for complete search history.

(56) References Cited

U.S. PATENT DOCUMENTS

| | | | | |
|---|---|---|---|---|
| 2011/0260099 | A1* | 10/2011 | Paulsen | B82Y 30/00 |
| | | | | 252/182.1 |
| 2011/0262796 | A1* | 10/2011 | Shimooka | H01M 4/483 |
| | | | | 429/231.95 |
| 2016/0351948 | A1 | 12/2016 | Profatilova et al. | |
| 2021/0234163 | A1* | 7/2021 | Nakamura | C01G 53/50 |
| 2021/0305566 | A1* | 9/2021 | Baek | H01M 10/0525 |

FOREIGN PATENT DOCUMENTS

| | | | |
|---|---|---|---|
| JP | 2001-222994 | A | 8/2001 |
| JP | 2006-351378 | A | 12/2006 |
| JP | 2018-37380 | A | 3/2018 |
| JP | 6595506 | B2 | 10/2019 |
| WO | WO 2018/132903 | * | 7/2018 ......... H01M 4/1391 |
| WO | 2020/262348 | A1 | 12/2020 |
| WO | 2021/059728 | A1 | 4/2021 |

OTHER PUBLICATIONS

Li et al. "Is Cobalt Needed in Ni-Rich Positive Electrode Materials for Lithium Ion Batteries?" Journal of the Electrochemical Society, 166 (4) A429-A439 (2019) (Year: 2019).*
Wang et al. "Effects of Ca doping on the electrochemical properties of LiNi0.8Co0.2O2 cathode material." Solid State Ionics 177 (2006) 1027-1031 (Year: 2006).*
International Search Report dated Jul. 13, 2021, issued in counterpart International Application No. PCT/JP2021/015958.
Written Opinion of the International Searching Authority dated Jul. 13, 2021, issued in counterpart International Application No. PCT/JP2021/015958.
Medvedev, O. S. et al., "Comparison of conductive additives for high-power applications of Li-ion batteries", Ionics, Kiel, DE, vol. 26, No. 9, May 27, 2020, pp. 4277-4286. (10 pages).
Extended (Supplementary) European Search Report dated Jun. 11, 2024, issued in counterpart EP application No. 21811801.6. (10 pages).
Office Action dated Feb. 16, 2023, issued in counterpart In Application No. 202247066703, with English Translation. (6 pages).
Office Action dated Apr. 15, 2025, issued in counterpart JP Application No. 2022-527586. (4 pages).

\* cited by examiner

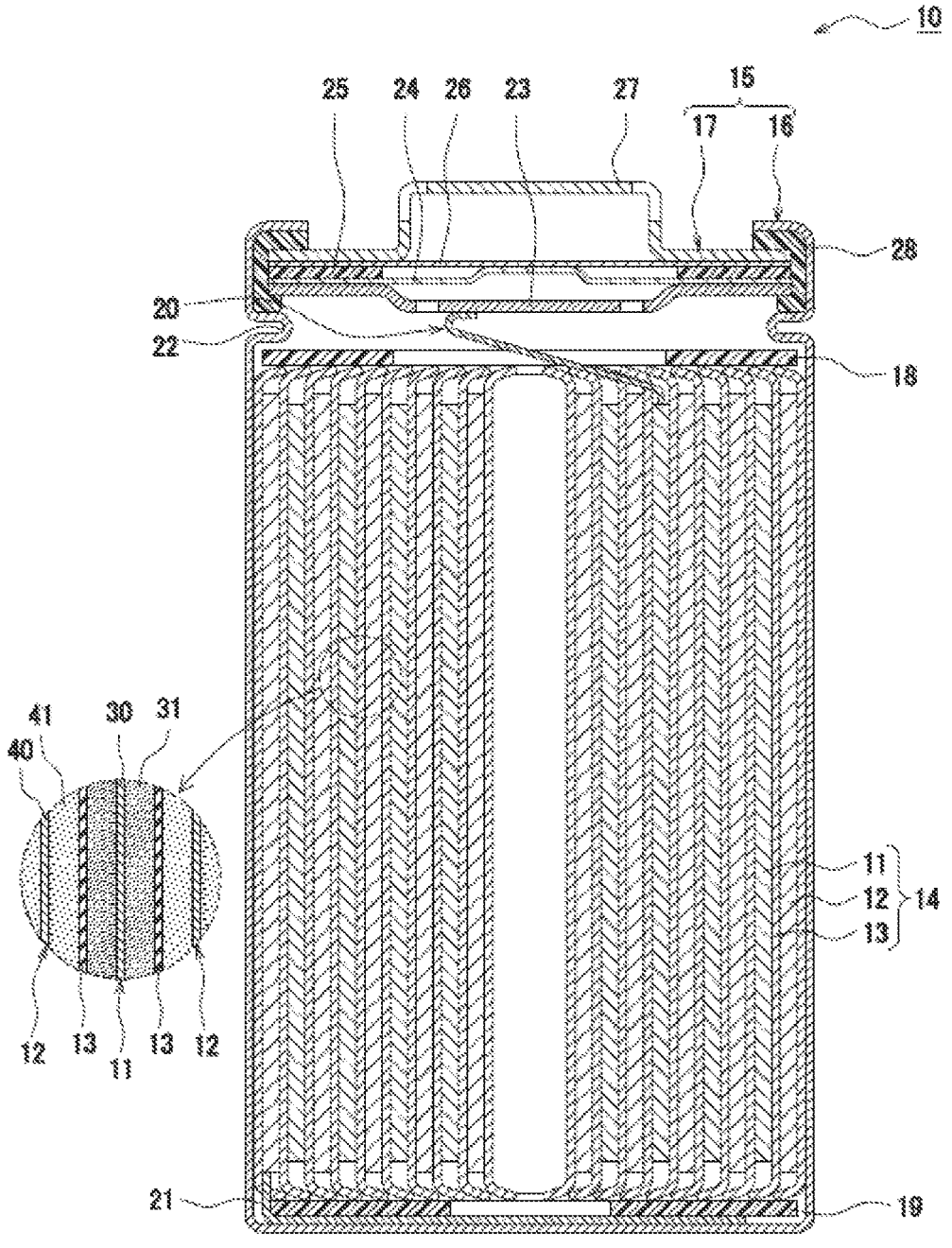

POSITIVE ELECTRODE FOR NONAQUEOUS ELECTROLYTE SECONDARY BATTERIES, AND NONAQUEOUS ELECTROLYTE SECONDARY BATTERY

CROSS REFERENCE TO RELATED APPLICATIONS

This Application is the National Stage of International Application No. PCT/JP2021/015958, filed on Apr. 20, 2021, which claims priority from Application No. 2020-094168 filed on May 29, 2020 in Japan. The entire contents of these applications are incorporated herein by reference in their entirety.

TECHNICAL FIELD

The present disclosure relates to a positive electrode for a non-aqueous electrolyte secondary battery and a non-aqueous electrolyte secondary battery.

BACKGROUND ART

Lithium-transition metal composite oxides have been conventionally widely used as positive electrode active materials for secondary batteries such as lithium-ion batteries, and for secondary batteries having a high capacity, a lithium-excess positive electrode active material containing much lithium has attracted attention. The secondary batteries are also required to maintain the battery capacity even with repeated charges and discharges. For example, Patent Literature 1 discloses a lithium-ion secondary battery in which a positive electrode includes a lithium-excess positive electrode active material and a carbon fiber to improve charge-discharge cycle characteristics.

CITATION LIST

Patent Literature

PATENT LITERATURE 1: Japanese Patent No. 6595506

SUMMARY

Patent Literature 1 discloses a positive electrode active material containing Ni, Mn, and Co. In a lithium-transition metal composite oxide included in a positive electrode active material, considered is a design of increasing a content rate of Ni to obtain a high battery capacity and decreasing a content rate of Co to reduce a manufacturing cost. However, a lithium-transition metal composite oxide with high Ni content containing substantially no Co generates cracking on the positive electrode active material with charge and discharge, resulting in increased battery resistance and deterioration of charge-discharge cycle characteristics in some cases. The achievement of both the battery resistance and the charge-discharge cycle characteristics is not considered in the art in Patent Literature 1, and the art still has room for improvement.

A positive electrode for a non-aqueous electrolyte secondary battery of an aspect of the present disclosure comprises: a positive electrode current collector; and a positive electrode mixture layer formed on a surface of the positive electrode current collector. The positive electrode mixture layer includes at least: a positive electrode active material including a lithium-transition metal composite oxide; and a carbon fiber, and the lithium-transition metal composite oxide has a layered rock-salt structure, and contains substantially no Co and contains at least Ni, Al, and Ca.

A non-aqueous electrolyte secondary battery of an aspect of the present disclosure comprises: the above positive electrode for a non-aqueous electrolyte secondary battery; a negative electrode; and a non-aqueous electrolyte.

According to the positive electrode active material for a non-aqueous electrolyte secondary battery of an aspect of the present disclosure, the resistance of the secondary battery may be reduced, and the lowering of the battery capacity with charge and discharge may be inhibited.

BRIEF DESCRIPTION OF DRAWING

FIG. 1 is a vertical sectional view of a non-aqueous electrolyte secondary battery of an example of an embodiment.

DESCRIPTION OF EMBODIMENTS

A lithium-transition metal composite oxide included as a positive electrode active material in a positive electrode of a secondary battery may cause cracking with charge and discharge. When the cracking occurs on the lithium-transition metal composite oxide, a conductive pathway cannot be formed inside the lithium-transition metal composite oxide, which generates a part that fails to contribute to charge and discharge, and the battery capacity lowers in some cases. In addition, when the cracking occurs on the lithium-transition metal composite oxide, an area contacting with a conductive agent is reduced, which increases the battery resistance in some cases. Even in this case, when the lithium-transition metal composite oxide is a lithium-transition metal composite oxide including Co, which has high electron conductivity, the influence on the increase in the resistance due to the cracking may be reduced. However, when a content rate of Ni is increased to obtain a high battery capacity and a content rate of Co is decreased to reduce a manufacturing cost, the lowering of the charge-discharge cycle characteristics and the increase in the battery resistance have to be inhibited. The present inventors have intensively investigated the above problem, and consequently found that adding Ca to a positive electrode active material with high Ni content including no Co, and including a carbon fiber in a positive electrode mixture layer can specifically inhibit the lowering of the charge-discharge cycle characteristics and the increase in the battery resistance with synergistic effect. In particular, in a positive electrode including a lithium-excess positive electrode active material, unstable oxygen is likely to be present near the surface, and the charge-discharge cycle characteristics are likely to deteriorate. Therefore, the effect of the present disclosure is remarkable.

Hereinafter, an example of embodiments of the non-aqueous electrolyte secondary battery according to the present disclosure will be described in detail. Hereinafter, a cylindrical battery in which a wound electrode assembly is housed in a cylindrical battery case will be exemplified, but the electrode assembly is not limited to a wound electrode assembly, and may be a laminated electrode assembly in which a plurality of positive electrodes and a plurality of negative electrodes are alternately stacked one by one with a separator interposed therebetween. The battery case is not limited to a cylindrical battery case, and may be, for example, a rectangular battery case, a coin-shaped battery case, or a battery case composed of laminated sheets including a metal layer and a resin layer.

FIG. 1 is a vertical sectional view of a non-aqueous electrolyte secondary battery 10 of an example of an embodiment. As exemplified in FIG. 1, the non-aqueous electrolyte secondary battery 10 comprises an electrode assembly 14, a non-aqueous electrolyte, and a battery case 15 housing the electrode assembly 14 and the non-aqueous electrolyte. The electrode assembly 14 has a wound structure in which a positive electrode 11 and a negative electrode 12 are wound with a separator 13 interposed therebetween. The battery case 15 is composed of a bottomed cylindrical exterior housing can 16 and a sealing assembly 17 sealing an opening of the exterior housing can 16.

The electrode assembly 14 is composed of the elongated positive electrode 11, the elongated negative electrode 12, two elongated separators 13, a positive electrode tab 20 bonded to the positive electrode 11, and a negative electrode tab 21 bonded to the negative electrode 12. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). The two separators 13 are formed to be one size larger than at least the positive electrode 11, and disposed to, for example, sandwich the positive electrode 11.

The non-aqueous electrolyte secondary battery 10 comprises insulating plates 18 and 19 disposed on the upper and lower sides of the electrode assembly 14, respectively. In the example illustrated in FIG. 1, the positive electrode tab 20 attached to the positive electrode 11 extends through a through hole in the insulating plate 18 toward a side of the sealing assembly 17, and the negative electrode tab 21 attached to the negative electrode 12 extends along an outside of the insulating plate 19 toward the bottom side of the exterior housing can 16. The positive electrode tab 20 is connected to a lower surface of a bottom plate 23 of the sealing assembly 17 by welding or the like, and a cap 27 of the sealing assembly 17 electrically connected to the bottom plate 23 becomes a positive electrode terminal. The negative electrode tab 21 is connected to a bottom inner surface of the exterior housing can 16 by welding or the like, and the exterior housing can 16 becomes a negative electrode terminal.

The exterior housing can 16 is, for example, a bottomed cylindrical metallic container. A gasket 28 is provided between the exterior housing can 16 and the sealing assembly 17 to seal the inside space of the battery case 15. The exterior housing can 16 has a groove 22 that is formed by, for example, pressing a side wall thereof from the outside and that supports the sealing assembly 17. The groove 22 is preferably formed in a circular shape along a circumferential direction of the exterior housing can 16, and supports the sealing assembly 17 with the upper surface thereof.

The sealing assembly 17 has a structure having the bottom plate 23, a lower vent member 24, an insulating member 25, an upper vent member 26, and the cap 27, which are stacked in this order from the electrode assembly 14 side. Each member constituting the sealing assembly 17 has, for example, a disk shape or a ring shape, and each member except for the insulating member 25 is electrically connected to each other. The lower vent member 24 and the upper vent member 26 are connected to each other at respective central parts thereof, and the insulating member 25 is interposed between the respective circumferential parts of the vent members 24 and 26. If the internal pressure of the battery increases due to abnormal heat generation, the lower vent member 24 is deformed so as to push the upper vent member 26 toward the cap 27 side and breaks, resulting in cutting off of an electrical pathway between the lower vent member 24 and the upper vent member 26. If the internal pressure further increases, the upper vent member 26 breaks, and gas is discharged through the opening of the cap 27.

Hereinafter, the positive electrode 11, the negative electrode 12, the separator 13, and the non-aqueous electrolyte, which constitute the non-aqueous electrolyte secondary battery 10, particularly a positive electrode active material included in a positive electrode mixture layer 31 constituting the positive electrode 11, will be described in detail.

[Positive Electrode]

The positive electrode 11 comprises: a positive electrode current collector 30; and a positive electrode mixture layer 31 formed on a surface of the positive electrode current collector 30. The positive electrode mixture layer 31 may be formed on both surfaces of the positive electrode current collector 30. For a material of the positive electrode current collector 30, a foil of a metal such as stainless steel, aluminum, an aluminum alloy, and titanium, a film in which such a metal is disposed on a surface layer thereof, and the like may be used, for example.

The positive electrode mixture layer 31 includes at least: a positive electrode active material; and a carbon fiber. A thickness of the positive electrode mixture layer 31 is, for example, 10 $\mu$m to 150 $\mu$m on one side of the positive electrode current collector 30. The positive electrode 11 may be produced by, for example, applying a positive electrode slurry including the positive electrode active material, the carbon fiber, and the like on the surface of the positive electrode current collector 30, drying and subsequently compressing the applied film to form the positive electrode mixture layers 31 on both the surfaces of the positive electrode current collector 30.

The positive electrode active material includes a lithium-transition metal composite oxide. The lithium-transition metal composite oxide has a layered rock-salt structure. Examples of the layered rock-salt structure of the lithium-transition metal composite oxide include a layered rock-salt structure belonging to the space group R-3m and a layered rock-salt structure belonging to the space group C2/m. The lithium-transition metal composite oxide preferably has a layered rock-salt structure belonging to the space group R-3m from the viewpoints of the higher capacity and the stability of the crystalline structure.

A crystallite diameter s of the lithium-transition metal composite oxide is preferably 500 Å$\leq$s$\leq$1100 Å, more preferably 600 Å$\leq$s$\leq$1000 Å, and particularly preferably 700 Å$\leq$s$\leq$950 Å. Within this range, a smaller crystallite diameter s is more preferable because the charge-discharge cycle characteristics are improved and the battery resistance is reduced. If the crystallite diameter s of the lithium-transition metal composite oxide is smaller than 500 Å, the crystallinity is lowered, leading to a lowered battery capacity in some cases. If the crystallite diameter s of the lithium-transition metal composite oxide is larger than 1100 Å, diffusibility of Li deteriorates, resulting in deterioration of output characteristics of the battery in some cases.

The crystallite diameter s of the lithium-transition metal composite oxide is calculated from a full width at half maximum n of a diffraction peak of a (003) plane of an X-ray diffraction pattern by X-ray diffraction with the Scherrer equation. The Scherrer equation is described as follows.

$$s = K\lambda/B \cos \theta$$

wherein s represents the crystallite diameter, $\lambda$ represents a wavelength of the X-ray, B represents the full width at half maximum of the diffraction peak of the (003) plane, $\theta$ represents a diffraction angle (rad), and K represents a Scherrer constant. In the present embodiment, K is 0.9.

The X-ray diffraction pattern is obtained by a powder X-ray diffraction method using a powder X-ray diffraction apparatus (product name "RINT-TTR," manufactured by Rigaku Corporation, radiation source: Cu-K$\alpha$) and with the following conditions.

Measuring Range: 15 to 120°
Scanning Rate: 4°/min
Analyzing Range: 30 to 120°
Background: B-spline
Profile Function: Split pseudo-Voigt function
Restricting Conditions: Li(3a)+Ni(3a)=1
    Ni(3a)+Ni(3b)=$\alpha$ ($\alpha$ represents each Ni content proportion)
ICSD No.: 98-009-4814

The lithium-transition metal composite oxide may be, for example, secondary particles formed by aggregation of a plurality of primary particles. A particle diameter of the primary particles constituting the secondary particle is, for example, 0.02 µm to 2 µm. The particle diameter of the primary particles is measured as a diameter of a circumscribed circle in a particle image observed with a scanning electron microscope (SEM).

The secondary particles of the lithium-transition metal composite oxide may be particles having a median diameter (D50) on a volumetric basis of, for example, 2 µm to 30 µm, preferably 2 µm to 20 µm, and more preferably 6 µm to 15 µm. The D50, also referred to as a median diameter, means a particle diameter at which a cumulative frequency is 50% from a smaller particle diameter side in a particle size distribution on a volumetric basis. The particle size distribution of the secondary particles of the lithium-transition metal composite oxide may be measured by using a laser diffraction-type particle size distribution measuring device (for example, MT3000II, manufactured by MicrotracBEL Corp.) with water as a dispersion medium.

The lithium-transition metal composite oxide contains substantially no Co, and contains at least Ni, Al, and Ca. Here, containing substantially no Co means that the lithium-transition metal composite oxide contains only 0.01 mol % or less of Co based on the total amount of the metal elements excluding Li. Since Co is expensive, containing substantially no Co may reduce the manufacturing cost.

A content of Ni in the lithium-transition metal composite oxide may be 80 mol % or more based on the total amount of the metal elements excluding Li. This may increase the battery capacity. The content of Ni in the lithium-transition metal composite oxide is preferably 85 mol % or more, and more preferably 90 mol % or more based on the total amount of the metal elements excluding Li. The content of Ni in the lithium-transition metal composite oxide is preferably 96 mol % or less based on the total amount of the metal elements excluding Li.

A content of Al in the lithium-transition metal composite oxide is preferably 1 mol % to 10 mol %, and more preferably 3 mol % to 8 mol % based on the total amount of the metal elements excluding Li. Since an oxidation number of Al does not change during charge and discharge, containing Al in the transition metal layer in the layered rock-salt structure is considered to stabilize the structure of the transition metal layer. Meanwhile, if the content of Al is 10 mol % or more, an Al impurity may be generated to lower the battery capacity.

A content of Ca in the lithium-transition metal composite oxide may be 0.5 mol % or less based on the total amount of the metal elements excluding Li. If the content of Ca is more than 0.5 mol %, a Ca compound may increase the battery resistance. The lithium-transition metal composite oxide containing Ca may further improves the particle strength with a synergistic effect with the carbon fiber, described later, to improve the charge-discharge cycle characteristics and reduce the battery resistance. The content of Ca in the lithium-transition metal composite oxide is preferably 0.1 mol % or more based on the total amount of the metal elements excluding Li. If the content of Ca is less than 0.1 mol %, the effect of improving the particle strength may not be sufficiently obtained. Improvement in the particle strength may inhibit occurrence of cracking on the lithium-transition metal composite oxide during charge and discharge.

The lithium-transition metal composite oxide may further contain Mn. This improves thermal stability of the lithium-transition metal composite oxide. A content of Mn in the lithium-transition metal composite oxide is preferably 0 mol % to 15 mol %, and more preferably 1 mol % to 10 mol % or less based on the total amount of the metal elements excluding Li.

The lithium-transition metal composite oxide may further contain Nb. This may reduce the resistance during charge and discharge to increase an initial Coulomb efficiency. A content of Nb in the lithium-transition metal composite oxide is preferably 0 mol % to 0.5 mol %, and more preferably 0 mol % to 0.3 mol % based on the total amount of the metal elements excluding Li.

The lithium-transition metal composite oxide may be a composite oxide represented by the general formula $Li_aN_{i_x}Al_yMn_zM_uCa_vNb_wO_{2-b}$, wherein $0.9 \leq a \leq 1.1$, $0.80 \leq x \leq 0.96$, $0.01 \leq y \leq 0.10$, $0 \leq z \leq 0.15$, $0 \leq u \leq 0.10$, $0 < v \leq 0.005$, $0 \leq w \leq 0.005$, $0 \leq b \leq 0.05$, $x+y+z+v+w=1$, and M includes at least one element selected from the group consisting of Fe, Ti, Si, Zr, Mo, and Zn. The mole fractions of the metal elements contained in the entire particle of the lithium-transition metal composite oxide are measured by inductively coupled plasma (ICP) atomic emission spectroscopy. Ca and Nb may form a solid solution in the lithium-transition metal composite oxide, or may be present on surfaces of the primary particles of the lithium-transition metal composite oxide. For example, some of Ca and Nb may form a solid solution in the lithium-transition metal composite oxide and the others thereof may be present on the surfaces of the primary particles of the lithium-transition metal composite oxide. From the viewpoint of improving the particle strength of the lithium-transition metal composite oxide, Ca is preferably at least partially present on the surfaces of the primary particles of the lithium-transition metal composite oxide.

A content rate of the lithium-transition metal composite oxide in the positive electrode active material is preferably 90 mass % or more, and more preferably 99 mass % or more based on the total mass of the positive electrode active material in terms of, for example, increasing the battery capacity, effectively inhibiting deterioration of the charge-discharge cycle characteristics, and the like.

The positive electrode active material of the present embodiment may include a lithium-transition metal composite oxide other than the lithium-transition metal composite oxide of the present embodiment. Examples of the other lithium-transition metal composite oxide include a lithium-transition metal composite oxide having a Ni content rate of 0 mol % or more and less than 80 mol %.

Next, an example of a method of manufacturing the lithium-transition metal composite oxide will be described.

A method of manufacturing the positive electrode active material may comprise, for example: a first step of obtaining a composite oxide including Ni, Al, and an optional metal element; a second step of mixing the composite oxide obtained in the first step and a Li compound to obtain a mixture; and a third step of calcining this mixture.

In the first step, for example, with stirring a solution of metal salts including Ni, Al, and the optional metal element (such as Mn and Fe), a solution of an alkali such as sodium hydroxide is added dropwise in order to adjust a pH on the alkaline side (for example, 8.5 to 12.5) to precipitate (coprecipitate) a composite hydroxide including Ni, Al, and the optional metal element. The composite hydroxide may be calcined to obtain a composite oxide including Ni, Al, and the optional metal element. A calcining temperature is not particularly limited, and may be, for example, within a range of 300° C. to 600° C.

In the second step, the composite oxide obtained in the first step, a Li compound, and a Ca compound may be mixed to obtain a mixture. Examples of the Li compound include $Li_2CO_3$, LiOH, $Li_2O_2$, $Li_2O$, $LiNO_3$, $LiNO_2$, $Li_2SO_4$, $LiOH.H_2O$, LiH, and LiF. Examples of the Ca compound include $Ca(OH)_2$, CaO, $CaCO_3$, $CaSO_4$, and $Ca(NO_3)_2$. A particle diameter of the Ca compound is preferably 0.1 μm or more and 20 μm or less. When the Ca compound includes moisture, the compound may be used after a dehydration treatment such as drying to inhibit water generation during the calcination. A Nb compound may be further mixed. Examples of the Nb compound include $Nb_2O_5$, $Nb_2O_5.nH_2O$, $LiNbO_3$, and $NbCl_5$. A particle diameter of the Nb compound is preferably 0.1 μm or more and 20 μm or less. When the Nb compound includes moisture, the compound may be used after a dehydration treatment such as drying to inhibit water generation during the calcination. A mixing ratio between the above composite oxide, the Li compound, the Ca compound, and the Nb compound is appropriately determined so that each element in a finally obtained Li-transition metal oxide has a desired ratio. A molar ratio of the metal elements excluding Li:Li is preferably within a range of 1:0.9 to 1:1.1. The content of Ca in the total amount of the metal elements excluding Li is, for example, 0.5 mol % or less. When Nb is added, the content of Nb in the total amount of the metal elements excluding Li is, for example, 0.5 mol % or less, and preferably 0.3 mol % or less. In the second step, other metal raw materials may be added as necessary when the composite oxide obtained in the first step and the Li compound are mixed. The other metal raw materials are oxides and the like including metal elements other than the metal elements constituting the composite oxide obtained in the first step.

In the third step, the mixture obtained in the second step may be calcined under an oxygen atmosphere to obtain the lithium-transition metal composite oxide according to the present embodiment. In the third step, a heating rate within 450° C. or higher and 680° C. or lower is within a range of more than 1.0° C./min and 5.5° C./min or less, and a highest reaching temperature may be within a range of 700° C. or higher and 850° C. or lower. The heating rate within 450° C. or higher and 680° C. or lower may be 0.1° C./min or more and 5.5° C./min or less, or may be 0.2° C./min or more and 5.5° C./min or less. A heating rate from higher than 680° C. to the highest reaching temperature may be, for example, 0.1° C./min to 3.5° C./min. A holding time at the highest reaching temperature may be 1 hour or longer and 10 hours or shorter. The third step may be a multi-stage calcination, and the first heating rate and the second heating rate may be plurally set in each temperature region as long as the heating rates are within the above specified ranges.

In the manufacturing method of the present embodiment, to improve the battery capacity and safety, a powder of the lithium-transition metal composite oxide obtained in the third step may be washed with water. This washing with water may be performed by a known method under known conditions, and may be performed within a range not eluting lithium from the lithium-transition metal composite oxide and the battery characteristics deteriorate. A W compound may be mixed before or after this washing with water. Examples of this W compound include tungsten oxide ($WO_3$) and lithium tungstate ($Li_2WO_4$, $Li_4WO_5$, and $Li_6W_2O_9$). When mixed after the washing with water, the W compound may be mixed by any method of mixing after drying and mixing after only solid-liquid separation without drying.

The carbon fiber included in the positive electrode mixture layer 31 functions as a conductive agent. A content of the carbon fiber in the positive electrode mixture layer may be 0.01 parts by mass to 1 part by mass based on 100 parts by mass of the positive electrode active material. It is considered that the positive electrode mixture layer containing the above predetermined amount of the carbon fiber forms a conductive pathway in the positive electrode mixture layer to contribute to the inhibition of lowering the capacity with a charge-discharge cycle. If the content of the carbon fiber is less than 0.01 parts by mass, the conductive pathway in the positive electrode mixture layer is not sufficiently formed. If the content of the carbon fiber is more than 1 part by mass, move of the non-aqueous solvent and the electrolyte in the positive electrode mixture layer is likely to be inhibited. Both the above cases are likely to lower the capacity with a charge-discharge cycle. Within this range, the synergistic effect with Ca included in the positive electrode active material further improves the particle strength, and may improve the charge-discharge cycle characteristics and reduce the battery resistance.

Examples of the carbon fiber include known materials used as a conductive agent of a battery, and include carbon nanotube (CNT), carbon nanofiber (CNF), vapor-grown carbon fiber (VGCF), electrospinning-method carbon fiber, polyacrylonitrile (PAN)-based carbon fiber, and pitch-based carbon fiber.

An outermost peripheral diameter of the carbon fiber is preferably 1 nm to 20 nm, and more preferably 1.5 nm to 10 nm from the viewpoints of, for example, improvement in conductivity of the carbon fiber itself and formation of the conductive pathway in the positive electrode mixture layer with a small amount addition of the carbon fiber having the improved conductivity. The outermost peripheral diameter of the carbon fiber is an average value of outer diameters of 50 random carbon fibers measured with a field emission scanning electron microscope (FE-SEM) or a transmission electron microscope (TEM).

A fiber length of the carbon fiber is preferably 0.1 μm to 20 μm, more preferably 1 μm to 10 μm, and particularly preferably 1 μm to 5 μm in order to, for example, form the conductive pathway between the active materials in the positive electrode mixture layer. The fiber length of the carbon fiber is an average value of lengths of 50 random carbon fibers measured with a field emission scanning electron microscope (FE-SEM).

Among the above exemplified carbon fibers, the carbon fiber preferably includes a carbon nanotube in terms of, for example, further inhibition of lowering the capacity with a charge-discharge cycle. Examples of the carbon nanotube include single-wall carbon nanotube, double-wall carbon nanotube, and multi-wall carbon nanotube. The single-wall carbon nanotube (SWCNT) is a carbon nanostructure in which one layer of graphene sheet constitutes one cylindrical shape. The double-wall carbon nanotube is a carbon nanostructure in which two layers of graphene sheet are concentrically stacked to constitute one cylindrical shape. The multi-wall carbon nanotube is a carbon nanostructure in which three or more layers of graphene sheet are concentrically stacked to constitute one cylindrical shape. The graphene sheet refers to a layer in which carbon atoms of an sp2 hybrid orbit constituting crystals of graphite are positioned at vertexes of the regular hexagon. A shape of the carbon nanotube is not limited. Examples of the shape include various forms including needle, cylindrical tube, fish-born or cup-stacked layer, cards (platelet), and coil.

The carbon nanotube included in the positive electrode mixture layer preferably includes the single-wall carbon nanotube. The single-wall carbon nanotube typically forms the conductive pathway in the positive electrode mixture layer with a small amount compared with the multi-wall carbon nanotube, thereby it is considered that the positive electrode mixture layer including a small amount of the single-wall carbon nanotube facilitates the move of the non-aqueous solvent and the electrolyte in the positive electrode mixture layer. The positive electrode mixture layer may include not only the single-wall carbon nanotube but also the double-wall carbon nanotube and the multi-wall carbon nanotube.

The positive electrode mixture layer may further include a particulate conductive agent, and a content of the particulate conductive agent in the positive electrode mixture layer may be 3 parts by mass or less based on 100 parts by mass of the positive electrode active material. The particulate conductive agent included in the positive electrode mixture layer at the above predetermined amount increases conductivity between the positive electrode active material particles to improve the output characteristics of the battery in some cases. Examples of the particulate conductive agent may include a carbon material such as carbon black, acetylene black, Ketjenblack, and graphite. These materials may be used singly, or may be used in combinations of two or more thereof. When the particulate conductive agent is used, a primary particle diameter thereof is preferably 5 nm or more and 100 nm or less.

The positive electrode mixture layer 31 may further include a binder. Examples of the binder include a fluoropolymer and a rubber polymer. Examples of the fluoropolymer include polytetrafluoroethylene (PTFE), polyvinylidene fluoride (PVdF), and a modified polymer thereof. Examples of the rubber polymer include an ethylene-propylene-isoprene copolymer and an ethylene-propylene-butadiene copolymer. These materials may be used singly, or may be used in combinations of two or more thereof

[Negative Electrode]

The negative electrode 12 has: a negative electrode current collector 40; and negative electrode mixture layers 41 formed on both surfaces of the negative electrode current collector 40. For the negative electrode current collector 40, a foil of a metal stable within a potential range of the negative electrode 12, such as copper and a copper alloy, a film in which such a metal is disposed on a surface layer thereof, and the like may be used. The negative electrode mixture layer 41 may include a negative electrode active material and a binder. A thickness of the negative electrode mixture layer 41 is, for example, 10 μm to 150 μm on one side of the negative electrode current collector 40. The negative electrode 12 may be produced by, for example, applying a negative electrode slurry including the negative electrode active material, the binder, and the like on the surfaces of the negative electrode current collector 40, drying and subsequently rolling the applied film to form the negative electrode mixture layers 41 on both the surfaces of the negative electrode current collector 40.

The negative electrode active material included in the negative electrode mixture layer 41 is not particularly limited as long as it may reversibly occlude and release lithium ions, and a carbon material such as graphite is typically used. The graphite may be any of: a natural graphite such as flake graphite, massive graphite, and amorphous graphite; and an artificial graphite such as massive artificial graphite and graphitized mesophase-carbon microbead. For the negative electrode active material, a metal to form an alloy with Li, such as Si and Sn, a metal compound including Si, Sn, or the like, a lithium-titanium composite oxide, and the like may be used. A material in which a carbon coating is provided on these materials may also be used. For example, a Si-containing compound represented by $SiO_x$ (0.5≤x≤1.6) or a Si-containing compound in which Si fine particles are dispersed in a lithium silicate phase represented by $Li_{2y}SiO_{(2+y)}$ (0<y<2) may be used in combination with the graphite.

For the binder included in the negative electrode mixture layer 41, a fluorine-containing resin such as PTFE and PVdF, PAN, a polyimide, an acrylic resin, a polyolefin, and the like may be used similar to that in the positive electrode 11, but styrene-butadiene rubber (SBR) is preferably used. The negative electrode mixture layer 41 may include CMC or a salt thereof, polyacrylic acid (PAA) or a salt thereof, polyvinyl alcohol (PVA), and the like.

[Separator]

For the separator 13, a porous sheet having an ion permeation property and an insulation property is used, for example. Specific examples of the porous sheet include a fine porous thin film, a woven fabric, and a nonwoven fabric. For a material of the separator, a polyolefin such as polyethylene and polypropylene, cellulose, and the like are preferable. The separator 13 may have a single-layered structure, or may have a multilayered structure. On a surface of the separator 13, a resin layer with high heat-resistance, such as an aramid resin, and a filler layer including a filler of an inorganic compound may be provided.

[Non-Aqueous Electrolyte]

The non-aqueous electrolyte includes, for example, a non-aqueous solvent and an electrolyte salt dissolved in the non-aqueous solvent. For the non-aqueous solvent, esters, ethers, nitriles such as acetonitrile, amides such as dimethylformamide, a mixed solvent of two or more thereof, and the like may be used, for example. The non-aqueous solvent may contain a halogen-substituted derivative in which hydrogen of these solvents is at least partially substituted with a halogen atom such as fluorine. Examples of the halogen-substituted derivative include fluorinated cyclic carbonates such as fluoroethylene carbonate (FEC), fluorinated chain carbonates, and fluorinated chain carboxylates such as methyl fluoropropionate (FMP).

Examples of the esters include: cyclic carbonates such as ethylene carbonate (EC), propylene carbonate (PC), and butylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates such as γ-butyrolactone (GBL) and γ-valerolactone (GVL);

and chain carboxylates such as methyl acetate, ethyl acetate, propyl acetate, methyl propionate (MP), and ethyl propionate (EP).

Examples of the ethers include: cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and a crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(CnF_{2n+1})_x$ ($1<x<6$, and n represents 1 or 2), $LiB_{10}Cl_{10}$, LiCl, LiBr, LiI, lithium chloroborane, a lithium lower aliphatic carboxylate, borate salts such as $Li_2B_4O_7$ and $Li(B(C_2O_4)F_2)$, and imide salts such as $LiN(SO_2CF_3)_2$ and $LiN(C_lF_{2l-1}SO_2)(C_mF_{2m-1}SO_2)$ {1 and m represent integers of 0 or more}. The lithium salts may be used singly, or a plurality types thereof may be mixed to be used. Among them, $LiPF_6$ is preferably used from the viewpoints of ion conductivity, electrochemical stability, and the like. A concentration of the lithium salt is, for example, 0.8 mol to 1.8 mol per litter of the non-aqueous solvent. Furthermore, vinylene carbonate and a propanesultone-based additive may be added.

EXAMPLES

Hereinafter, the present disclosure will be further described with Examples and Comparative Examples, but the present disclosure is not limited to these Examples.

[Production of Positive Electrode Active Material]

Example 1

A composite hydroxide obtained by a coprecipitation method and represented by $[Ni_{0.82}Al_{0.05}Mn_{0.13}](OH)_2$ was calcined at 500° C. for 8 hours to obtain a composite oxide ($Ni_{0.82}Al_{0.05}Mn_{0.13}O_2$) (the first step). The above composite oxide, $Ca(OH)_2$, and $Nb_2O_5$ were mixed so that the contents of Ca and Nb were 0.25 mol % and 0.22 mol %, respectively, based on the total amount of Ni, Al, and Mn in the above composite oxide. Furthermore, lithium hydroxide (LiOH) was mixed so that a molar ratio between: the total amount of Ni, Al, Mn, Ca, and Nb; and Li was 1:1.03 (the second step). This mixture was heated in an oxygen flow from a room temperature to 650° C. at a heating rate of 2.0° C./min, and then calcined from 650° C. to 750° C. at a heating rate of 0.5° C./min to obtain a calcined product. This calcined product was washed with water in order to remove an impurity to obtain a positive electrode active material of Example 1 (the third step).

Analysis with an ICP atomic emission spectrometer (product name "iCAP6300," manufactured by Thermo Fisher Scientific K.K.) demonstrated that the positive electrode active material of Example 1 had a composition of $LiNi_{0.816}Al_{0.05}Mn_{0.129}Ca_{0.0025}Nb_{0.0022}O_2$. Observation by energy dispersive X-ray spectroscopy (TEM-EDX) confirmed the presence of Ca on a surface of the lithium-transition metal composite oxide. A crystallite diameter s of the positive electrode active material of Example 1 was 876 Å with calculation from the X-ray diffraction pattern.

A particle strength of the positive electrode active material of Example 1 was measured by using a micro compression tester (model name "MCT-211," manufactured by SHIMADZU CORPORATION). Loading was performed under conditions of a compressive load of 90 mN and a loading rate of 2.66 mN/sec to measure a breaking load when secondary particles of the positive electrode active material of Example 1 broke. An average value of breaking loads on 5 positive electrode active materials was specified as the particle strength.

[Production of Positive Electrode]

100 parts by mass of the positive electrode active material of Example 1, 0.1 parts by mass of carbon nanotube (an outermost peripheral diameter ($\phi$) of 1.5 nm and a fiber length (L) of 5 μm) and 1 part by mass of acetylene black (AB) as conductive agents, and 2 parts by mass of polyvinylidene fluoride as a binder were mixed, and this mixture was further mixed with N-methyl-2-pyrrolidone (NMP) to prepare a positive electrode slurry. Then, this slurry was applied on a positive electrode current collector made of aluminum foil having a thickness of 15 μm, the applied film was dried, then the applied film was rolled with a roller, and cut to a predetermined electrode size to obtain a positive electrode in which positive electrode mixture layers were formed on both surfaces of the positive electrode current collector. An exposed part where the surface of the positive electrode current collector was exposed was provided on part of the positive electrode.

[Production of Negative Electrode]

Natural graphite was used as a negative electrode active material. The negative electrode active material, sodium carboxymethylcellulose (CMC-Na), and styrene-butadiene rubber (SBR) were mixed at a solid-content mass ratio of 100:1:1 in an aqueous solution to prepare a negative electrode slurry. This negative electrode slurry was applied on both surfaces of a negative electrode current collector made of copper foil, the applied film was dried, then the applied film was rolled by using a roller, and cut to a predetermined electrode size to obtain a negative electrode in which negative electrode mixture layers were formed on both surfaces of the negative electrode current collector. An exposed part where the surface of the negative electrode current collector was exposed was provided on part of the negative electrode.

[Preparation of Non-Aqueous Electrolyte]

Ethylene carbonate (EC), methyl ethyl carbonate (MEC), and dimethyl carbonate (DMC) were mixed at a volume ratio of 3:3:4. In this mixed solvent, lithium hexafluorophosphate ($LiPF_6$) was dissolved so that the concentration was 1.2 mol/L to prepare a non-aqueous electrolyte.

[Production of Test Cell]

An aluminum lead was attached to the exposed part of the positive electrode, a nickel lead was attached to the exposed part of the above negative electrode, and the positive electrode and the negative electrode were spirally wound with a separator made of a polyolefin interposed therebetween to produce a wound electrode assembly. This electrode assembly was housed in an exterior, the above non-aqueous electrolyte liquid was injected thereinto, and then an opening of the exterior was sealed to obtain a test cell.

[Evaluation of Capacity Maintenance Rate]

The following cycle test was performed on the above test cell. A discharge capacity at the 1st cycle and a discharge capacity at the 100th cycle of the cycle test were determined, and a capacity maintenance rate was calculated with the following formula.

Capacity Maintenance Rate (%)=(Discharge Capacity at 100th Cycle/Discharge Capacity at 1st Cycle)×100

<Cycle Test>

Under a temperature environment of 45° C., the test cell was charged at a constant current of 0.3 It until a cell voltage reached 4.2 V, and charged at a constant voltage of 4.2 V until a current value reached 1/50 It. Then, the test cell was discharged at a constant current of 0.5 It until the cell voltage reached 2.5 V. This charge-discharge cycle was repeated 100 cycles.

[Evaluation of Reaction Resistance]

Under a temperature condition at 25° C., the test cell was charged at a constant current of 0.3 It until a cell voltage reached 4.2 V, and then charged at a constant voltage of 4.2 V until a current value reached 1/50 It. Subsequently, the test cell was discharged at a constant current of 0.5 It until the cell voltage reached 2.5 V. Thereafter, under a temperature condition at 25° C., the test cell was again charged at a constant current of 0.3 It until the test voltage reached 4.2 V, and then charged at a constant voltage of 4.2 V until the current value reached 1/50 It. Then, alternating-current impedance with 20 kHz to 0.01 Hz of the test cell was measured by using an alternating-current impedance measuring device to draw a Nyquist diagram from the measured data, and a reaction resistance was determined from a size of the circular arc between 10 kHz to 0.1 Hz.

Comparative Example 1

A positive electrode active material was produced to evaluate a test cell in the same manner as in Example 1 except that: no $Ca(OH)_2$ was added in the second step to produce a positive electrode active material; and no AB was added in the production of the positive electrode.

Example 2

A test cell was evaluated in the same manner as in Example 1 except that: a composite hydroxide represented by $[Ni_{0.88}Al_{0.051}Mn_{0.069}](OH)_2$ was used to obtain a composite oxide ($Ni_{0.88}Al_{0.051}Mn_{0.069}O_2$) in the first step; the amount of $Ca(OH)_2$ to be added was changed so that the Ca content was 0.10 mol % based on the total amount of Ni, Al, and Mn in the composite oxide in the second step; and the highest reaching temperature was changed to 730° C. in the third step to produce a positive electrode active material; and in the production of the positive electrode, CNT having an outermost peripheral diameter (ϕ) of 8 nm and a fiber length (L) of 2 μm was used, and the amounts of CNT and AB to be added were changed to 1 part by mass and 1.5 parts by mass, respectively, based on 100 parts by mass of the positive electrode active material. Analysis by ICP atomic emission spectroscopy demonstrated that the obtained positive electrode active material had a composition of $LiNi_{0.877}Al_{0.051}Mn_{0.069}Ca_{0.001}Nb_{0.0022}O_2$. Observation by energy dispersive X-ray spectroscopy (TEM-EDX) confirmed the presence of Ca on a surface of the lithium-transition metal composite oxide.

Comparative Example 2

A positive electrode active material was obtained in the same manner as in Example 2 except that: no $Ca(OH)_2$ was added in the second step to produce a positive electrode active material; and no AB was added in the production of the positive electrode.

Example 3

A test cell was evaluated in the same manner as in Example 1 except that: a composite hydroxide represented by $[Ni_{0.91}Al_{0.051}Mn_{0.039}](OH)_2$ was used to obtain a composite oxide ($Ni_{0.91}Al_{0.051}Mn_{0.039}O_2$) in the first step; the amount of $Ca(OH)_2$ to be added was changed so that the Ca content was 0.50 mol % based on the total amount of Ni, Al, and Mn in the composite oxide in the second step; and the highest reaching temperature was changed to 725° C. in the third step to produce a positive electrode active material; and no AB was added in the production of the positive electrode. Analysis by ICP atomic emission spectroscopy demonstrated that the obtained positive electrode active material had a composition of $LiNi_{0.903}Al_{0.051}Mn_{0.039}Ca_{0.005}Nb_{0.0022}O_2$. Observation by energy dispersive X-ray spectroscopy (TEM-EDX) confirmed the presence of Ca on a surface of the lithium-transition metal composite oxide.

Example 4

A test cell was evaluated in the same manner as in Example 3 except that the highest reaching temperature was changed to 715° C. in the third step.

Example 5

A test cell was evaluated in the same manner as in Example 3 except that the highest reaching temperature was changed to 705° C. in the third step.

Example 6

A test cell was evaluated in the same manner as in Example 3 except that: the amount of $Ca(OH)_2$ to be added was changed so that the Ca content was 0.10 mol % based on the total amount of Ni, Al, and Mn in the composite oxide in the second step; and the highest reaching temperature was changed to 715° C. in the third step to produce a positive electrode active material; and in the production of the positive electrode, CNT having an outermost peripheral diameter (ϕ) of 8 nm and a fiber length (L) of 2 μm was used, and the amounts of CNT and AB to be added were changed to 0.5 parts by mass and 0.9 parts by mass, respectively, based on 100 parts by mass of the positive electrode active material.

Example 7

A test cell was evaluated in the same manner as in Example 3 except that: the amount of $Ca(OH)_2$ to be added was changed so that the Ca content was 0.20 mol % based on the total amount of Ni, Al, and Mn in the composite oxide in the second step; and the highest reaching temperature was changed to 715° C. in the third step to produce a positive electrode active material; and in the production of the positive electrode, the amount of AB to be added was changed to 2.5 parts by mass based on 100 parts by mass of the positive electrode active material.

Example 8

A test cell was evaluated in the same manner as in Example 3 except that: the amount of $Ca(OH)_2$ to be added was changed so that the Ca content was 0.25 mol % based on the total amount of Ni, Al, and Mn in the composite oxide in the second step; and the highest reaching temperature was changed to 715° C. in the third step to produce a positive electrode active material; and in the production of the positive electrode, the amount of AB to be added was changed to 0.75 parts by mass based on 100 parts by mass of the positive electrode active material.

Comparative Example 3

A test cell was evaluated in the same manner as in Example 3 except that: no $Ca(OH)_2$ was added in the second step; and the highest reaching temperature was changed to 715° C. in the third step to produce a positive electrode active material.

Comparative Example 4

A test cell was evaluated in the same manner as in Example 3 except that no CNT was added, and the amount of AB to be added was changed to 0.9 parts by mass based on 100 parts by mass of the positive electrode active material in the production of the positive electrode.

Example 9

A test cell was evaluated in the same manner as in Example 1 except that: a composite hydroxide represented by $[Ni_{0.925}Al_{0.055}Mn_{0.02}](OH)_2$ was used to obtain a composite oxide ($Ni_{0.925}Al_{0.055}Mn_{0.02}O_2$) based on the first step; the amount of $Ca(OH)_2$ to be added was changed so that the Ca content was 0.10 mol % based on the total amount of Ni, Al, and Mn in the composite oxide in the second step; and the highest reaching temperature was changed to 715° C. in the third step to produce a positive electrode active material; and in the production of the positive electrode, no AB was added, and the amount of CNT to be added was changed to 0.05 parts by mass based on 100 parts by mass of the positive electrode active material. Analysis by ICP atomic emission spectroscopy demonstrated that the obtained positive electrode active material had a composition of $LiNi_{0.922}Al_{0.055}Mn_{0.02}Ca_{0.001}Nb_{0.0022}O_2$. Observation by energy dispersive X-ray spectroscopy (TEM-EDX) confirmed the presence of Ca on a surface of the lithium-transition metal composite oxide.

Example 10

A test cell was evaluated in the same manner as in Example 9 except that: the amount of $Ca(OH)_2$ to be added was changed so that the Ca content was 0.50 mol % based on the total amount of Ni, Al, and Mn in the composite oxide in the second step to produce a positive electrode active material; and in the production of the positive electrode, the amounts of CNT and AB to be added were changed to 0.25 parts by mass and 2.5 parts by mass, respectively, based on 100 parts by mass of the positive electrode active material.

Comparative Example 5

A test cell was evaluated in the same manner as in Example 9 except that: no $Ca(OH)_2$ was added in the second step to produce a positive electrode active material; and in the production of the positive electrode, the amount of CNT to be added was changed to 0.1 parts by mass based on 100 parts by mass of the positive electrode active material.

Comparative Example 6

A test cell was evaluated in the same manner as in Example 9 except that: the amount of $Ca(OH)_2$ to be added was changed so that the Ca content was 0.25 mol % based on the total amount of Ni, Al, and Mn in the composite oxide in the second step to produce a positive electrode active material; and in the production of the positive electrode, no CNT was added, and the amount of AB to be added was changed to 0.75 parts by mass based on 100 parts by mass of the positive electrode active material.

Example 11

A test cell was evaluated in the same manner as in Example 1 except that: a composite hydroxide represented by $[Ni_{0.925}Al_{0.06}Mn_{0.015}](OH)_2$ was used to obtain a composite oxide ($Ni_{0.925}Al_{0.06}Mn_{0.015}O_2$) in the first step; the amount of $Ca(OH)_2$ to be added was changed so that the Ca content was 0.50 mol % based on the total amount of Ni, Al, and Mn in the composite oxide in the second step; and the highest reaching temperature was changed to 715° C. in the third step to produce a positive electrode active material; and in the production of the positive electrode, CNT having an outermost peripheral diameter (φ) of 8 nm and a fiber length (L) of 2 μm was used, and the amounts of CNT and AB to be added were changed to 0.7 parts by mass and 3 parts by mass, respectively, based on 100 parts by mass of the positive electrode active material. Analysis by ICP atomic emission spectroscopy demonstrated that the obtained positive electrode active material had a composition of $LiNi_{0.918}Al_{0.06}Mn_{0.015}Ca_{0.005}Nb_{0.0022}O_2$. Observation by energy dispersive X-ray spectroscopy (TEM-EDX) confirmed the presence of Ca on a surface of the lithium-transition metal composite oxide.

Comparative Example 7

A test cell was evaluated in the same manner as in Example 11 except that no $Ca(OH)_2$ was added in the second step to produce a positive electrode active material.

Example 12

A test cell was evaluated in the same manner as in Example 1 except that: a composite hydroxide represented by $[Ni_{0.93}Al_{0.03}Mn_{0.04}](OH)_2$ was used to obtain a composite oxide ($Ni_{0.93}Al_{0.03}Mn_{0.04}O_2$) in the first step; and the highest reaching temperature was changed to 715° C. in the third step to produce a positive electrode active material; and in the production of the positive electrode, CNT having an outermost peripheral diameter (φ) of 8 nm and a fiber length (L) of 2 μm was used, no AB was added, and the amount of CNT to be added was changed to 0.5 parts by mass based on 100 parts by mass of the positive electrode active material. Analysis by ICP atomic emission spectroscopy demonstrated that the obtained positive electrode active material had a composition of $LiNi_{0.926}Al_{0.03}Mn_{0.04}Ca_{0.0025}Nb_{0.0022}O_2$. Observation by energy dispersive X-ray spectroscopy (TEM-EDX) confirmed the presence of Ca on a surface of the lithium-transition metal composite oxide.

Comparative Example 8

A test cell was evaluated in the same manner as in Example 12 except that no $Ca(OH)_2$ was added in the second step to produce a positive electrode active material.

Example 13

A test cell was evaluated in the same manner as in Example 1 except that: a composite hydroxide represented by $[Ni_{0.94}Al_{0.03}Mn_{0.03}](OH)_2$ was used to obtain a composite oxide $(Ni_{0.94}Al_{0.03}Mn_{0.03}O_2)$ in the first step; the amount of $Ca(OH)_2$ to be added was changed so that the Ca content was 0.15 mol % based on the total amount of Ni, Al, and Mn in the composite oxide in the second step; and the highest reaching temperature was changed to 715° C. in the third step to produce a positive electrode active material; and in the production of the positive electrode, the amounts of CNT and AB to be added were changed to 0.4 parts by mass and 1.5 parts by mass, respectively, based on 100 parts by mass of the positive electrode active material. Analysis by ICP atomic emission spectroscopy demonstrated that the obtained positive electrode active material had a composition of $LiNi_{0.937}Al_{0.03}Mn_{0.03}Ca_{0.0015}Nb_{0.0022}O_2$. Observation by energy dispersive X-ray spectroscopy (TEM-EDX) confirmed the presence of Ca on a surface of the lithium-transition metal composite oxide.

Comparative Example 9

A test cell was evaluated in the same manner as in Example 13 except that no $Ca(OH)_2$ was added in the second step to produce a positive electrode active material.

Example 14

A test cell was evaluated in the same manner as in Example 1 except that: a composite hydroxide represented by $[Ni_{0.94}Al_{0.06}](OH)_2$ was used to obtain a composite oxide $(Ni_{0.94}Al_{0.06}O_2)$ in the first step; the amount of $Ca(OH)_2$ to be added was changed so that the Ca content was 0.10 mol % based on the total amount of Ni and Al in the composite oxide in the second step; and the highest reaching temperature was changed to 715° C. in the third step to produce a positive electrode active material; and in the production of the positive electrode, the amounts of CNT and AB to be added were changed to 0.02 parts by mass and 0.75 parts by mass, respectively, based on 100 parts by mass of the positive electrode active material. Analysis by ICP atomic emission spectroscopy demonstrated that the obtained positive electrode active material had a composition of $LiNi_{0.937}Al_{0.06}Ca_{0.001}Nb_{0.0022}O_2$. Observation by energy dispersive X-ray spectroscopy (TEM-EDX) confirmed the presence of Ca on a surface of the lithium-transition metal composite oxide.

Comparative Example 10

A test cell was evaluated in the same manner as in Example 14 except that no $Ca(OH)_2$ was added in the second step to produce a positive electrode active material.

Example 15

A test cell was evaluated in the same manner as in Example 13 except that, in the third step; pure water was added to the calcined product; the resultant was stirred, then filtered and separated to obtain a cake-like composition; thereafter a $WO_3$ powder was added so that the number of moles of W was 0.08 mol % based on the total amount of the metal elements excluding Li; and a heat-treating step was performed in the atmosphere at 250° C. for 3 hours to produce a positive electrode active material. Analysis by ICP atomic emission spectroscopy demonstrated that the obtained positive electrode active material had a composition of $LiNi_{0.937}Al_{0.03}Mn_{0.03}Ca_{0.0015}Nb_{0.0022}W_{0.0008}O_2$. Observation by energy dispersive X-ray spectroscopy (TEM-EDX) confirmed the presence of Ca on a surface of the lithium-transition metal composite oxide.

Comparative Example 11

A test cell was evaluated in the same manner as in Example 15 except that no $Ca(OH)_2$ was added in the second step to produce a positive electrode active material.

The capacity maintenance rate and reaction resistance in the Examples and the Comparative Examples are separately shown in Tables 1 to 8. Tables 1 to 8 also show the results of the ICP atomic emission spectroscopy analysis of the obtained positive electrode active materials. The reaction resistance and capacity maintenance rate of the test cell of Example 1 shown in Table 1 are shown relative to the reaction resistance and capacity maintenance rate of the test cell of Comparative Example 1 being 100.

The reaction resistance and capacity maintenance rate of the test cell of Example 2 shown in Table 2 are shown relative to the reaction resistance and capacity maintenance rate of the test cell of Comparative Example 2 being 100.

The reaction resistance and capacity maintenance rate of the test cells of Examples 3 to 8 and Comparative Example 4 shown in Table 3 are shown relative to the reaction resistance and capacity maintenance rate of the test cell of Comparative Example 3 being 100.

The reaction resistance and capacity maintenance rate of the test cells of Examples 9 and 10 and Comparative Example 6 shown in Table 4 are shown relative to the reaction resistance and capacity maintenance rate of the test cell of Comparative Example 5 being 100.

The reaction resistance and capacity maintenance rate of the test cell of Example 11 shown in Table 5 are shown relative to the reaction resistance and capacity maintenance rate of the test cell of Comparative Example 7 being 100.

The reaction resistance and capacity maintenance rate of the test cell of Example 12 shown in Table 6 are shown relative to the reaction resistance and capacity maintenance rate of the test cell of Comparative Example 8 being 100.

The reaction resistance and capacity maintenance rate of the test cell of Example 13 shown in Table 7 are shown relative to the reaction resistance and capacity maintenance rate of the test cell of Comparative Example 9 being 100.

The reaction resistance and capacity maintenance rate of the test cell of Example 14 shown in Table 8 are shown relative to the reaction resistance and capacity maintenance rate of the test cell of Comparative Example 10 being 100.

The reaction resistance and capacity maintenance rate of the test cell of Example 15 shown in Table 9 are shown relative to the reaction resistance and capacity maintenance rate of the test cell of Comparative Example 11 being 100.

TABLE 1

| | Positive electrode active material (lithium-transition metal composite oxide) | | | | | | | Conductive agent | | Evaluation results | |
| | Composition [%] | | | | | Particle strength | Crystallite diameter [Å] | CNT [parts by mass] | AB [parts by mass] | Capacity maintenance rate | Reaction resistance |
| | Nb | Ca | Ni | Al | Mn | | | | | | |
|---|---|---|---|---|---|---|---|---|---|---|---|
| Example 1 | 0.22 | 0.25 | 81.6 | 5.0 | 12.9 | 123 | 876 | 0.1 | 1 | 110 | 71 |
| Comparative Example 1 | 0.22 | 0.00 | 81.8 | 5.0 | 13.0 | 100 | 912 | 0.1 | 0 | 100 | 100 |

TABLE 2

| | Positive electrode active material (lithium-transition metal composite oxide) | | | | | | | Conductive agent | | Evaluation results | |
| | Composition [%] | | | | | Particle strength | Crystallite diameter [Å] | CNT [parts by mass] | AB [parts by mass] | Capacity maintenance rate | Reaction resistance |
| | Nb | Ca | Ni | Al | Mn | | | | | | |
|---|---|---|---|---|---|---|---|---|---|---|---|
| Example 2 | 0.22 | 0.10 | 87.7 | 5.1 | 6.9 | 127 | 843 | 1 | 1.5 | 111 | 52 |
| Comparative Example 2 | 0.22 | 0.00 | 87.8 | 5.1 | 6.9 | 100 | 932 | 1 | 0 | 100 | 100 |

TABLE 3

| | Positive electrode active material (lithium-transition metal composite oxide) | | | | | | | Conductive agent | | Evaluation results | |
| | Composition [%] | | | | | Particle strength | Crystallite diameter [Å] | CNT [parts by mass] | AB [parts by mass] | Capacity maintenance rate | Reaction resistance |
| | Nb | Ca | Ni | Al | Mn | | | | | | |
|---|---|---|---|---|---|---|---|---|---|---|---|
| Example 3 | 0.22 | 0.50 | 90.3 | 5.1 | 3.9 | 111 | 908 | 0.1 | 0 | 107 | 60 |
| Example 4 | 0.22 | 0.50 | 90.3 | 5.1 | 3.9 | 111 | 812 | 0.1 | 0 | 109 | 62 |
| Example 5 | 0.22 | 0.50 | 90.3 | 5.1 | 3.9 | 111 | 785 | 0.1 | 0 | 114 | 65 |
| Example 6 | 0.22 | 0.10 | 90.7 | 5.1 | 3.9 | 122 | 795 | 0.5 | 0.9 | 112 | 44 |
| Example 7 | 0.22 | 0.20 | 90.6 | 5.1 | 3.9 | 133 | 811 | 0.1 | 2.5 | 108 | 46 |
| Example 8 | 0.22 | 0.25 | 90.6 | 5.1 | 3.9 | 139 | 821 | 0.1 | 0.75 | 108 | 56 |
| Comparative Example 3 | 0.22 | 0.00 | 90.8 | 5.1 | 3.9 | 100 | 845 | 0.1 | 0 | 100 | 100 |
| Comparative Example 4 | 0.22 | 0.50 | 90.3 | 5.1 | 3.9 | 111 | 908 | 0 | 0.9 | 104 | 98 |

TABLE 4

| | Positive electrode active material (lithium-transition metal composite oxide) | | | | | | | Conductive agent | | Evaluation results | |
| | Composition [%] | | | | | Particle strength | Crystallite diameter [Å] | CNT [parts by mass] | AB [parts by mass] | Capacity maintenance rate | Reaction resistance |
| | Nb | Ca | Ni | Al | Mn | | | | | | |
|---|---|---|---|---|---|---|---|---|---|---|---|
| Example 9 | 0.22 | 0.10 | 92.2 | 5.5 | 2.0 | 121 | 782 | 0.05 | 0 | 114 | 71 |
| Example 10 | 0.22 | 0.50 | 91.8 | 5.5 | 2.0 | 132 | 791 | 0.25 | 2.5 | 115 | 47 |
| Comparative Example 5 | 0.22 | 0.00 | 92.3 | 5.5 | 2.0 | 100 | 830 | 0.1 | 0 | 100 | 100 |
| Comparative Example 6 | 0.22 | 0.25 | 92.1 | 5.5 | 2.0 | 111 | 801 | 0 | 0.75 | 101 | 98 |

TABLE 5

| | Positive electrode active material (lithium-transition metal composite oxide) | | | | | | | Conductive agent | | Evaluation results | |
|---|---|---|---|---|---|---|---|---|---|---|---|
| | Composition [%] | | | | | Particle | Crystallite diameter | CNT [parts by | AB [parts by | Capacity maintenance | Reaction |
| | Nb | Ca | Ni | Al | Mn | strength | [Å] | mass] | mass] | rate | resistance |
| Example 11 | 0.22 | 0.50 | 91.8 | 6.0 | 1.5 | 137 | 784 | 0.7 | 3 | 113 | 55 |
| Comparative Example 7 | 0.22 | 0.00 | 92.3 | 6.0 | 1.5 | 100 | 829 | 0.7 | 3 | 100 | 100 |

TABLE 6

| | Positive electrode active material (lithium-transition metal composite oxide) | | | | | | | Conductive agent | | Evaluation results | |
|---|---|---|---|---|---|---|---|---|---|---|---|
| | Composition [%] | | | | | Particle | Crystallite diameter | CNT [parts by | AB [parts by | Capacity maintenance | Reaction |
| | Nb | Ca | Ni | Al | Mn | strength | [Å] | mass] | mass] | rate | resistance |
| Example 12 | 0.22 | 0.25 | 92.6 | 3.0 | 4.0 | 108 | 795 | 0.5 | 0 | 112 | 59 |
| Comparative Example 8 | 0.22 | 0.00 | 92.8 | 3.0 | 4.0 | 100 | 827 | 0.5 | 0 | 100 | 100 |

TABLE 7

| | Positive electrode active material (lithium-transition metal composite oxide) | | | | | | | Conductive agent | | Evaluation results | |
|---|---|---|---|---|---|---|---|---|---|---|---|
| | Composition [%] | | | | | Particle | Crystallite diameter | CNT [parts by | AB [parts by | Capacity maintenance | Reaction |
| | Nb | Ca | Ni | Al | Mn | strength | [Å] | mass] | mass] | rate | resistance |
| Example 13 | 0.22 | 0.15 | 93.7 | 3.0 | 3.0 | 115 | 782 | 0.4 | 1.5 | 112 | 47 |
| Comparative Example 9 | 0.22 | 0.00 | 93.8 | 3.0 | 3.0 | 100 | 833 | 0.4 | 1.5 | 100 | 100 |

TABLE 8

| | Positive electrode active material (lithium-transition metal composite oxide) | | | | | | | Conductive agent | | Evaluation results | |
|---|---|---|---|---|---|---|---|---|---|---|---|
| | Composition [%] | | | | | Particle | Crystallite diameter | CNT [parts by | AB [parts by | Capacity maintenance | Reaction |
| | Nb | Ca | Ni | Al | Mn | strength | [Å] | mass] | mass] | rate | resistance |
| Example 14 | 0.22 | 0.10 | 93.7 | 6.0 | 0.0 | 108 | 774 | 0.02 | 0.75 | 112 | 60 |
| Comparative Example 10 | 0.22 | 0.00 | 93.8 | 6.0 | 0.0 | 100 | 841 | 0.02 | 0.75 | 100 | 100 |

TABLE 9

| | Positive electrode active material (lithium-transition metal composite oxide) | | | | | | | | Conductive agent | | Evaluation results | |
|---|---|---|---|---|---|---|---|---|---|---|---|---|
| | Composition [%] | | | | | | Particle | Crystallite diameter | CNT [parts by | AB [parts by | Capacity maintenance | Reaction |
| | Nb | Ca | Ni | Al | Mn | W | strength | [Å] | mass] | mass] | rate | resistance |
| Example 15 | 0.22 | 0.15 | 93.7 | 3.0 | 3.0 | 0.08 | 117 | 780 | 0.4 | 1.5 | 112 | 38 |
| Comparative Example 11 | 0.22 | 0.00 | 93.8 | 3.0 | 3.0 | 0.08 | 100 | 830 | 0.4 | 1.5 | 100 | 100 |

In all of Tables 1 to 9, the Examples exhibited a higher capacity maintenance rate and a lower reaction resistance than the Comparative Examples. In addition, the Examples exhibited a larger particle strength than the Comparative Examples. From the results, it has been found that the positive electrode mixture layer including: the lithium-transition metal composite oxide with high Ni content containing substantially no Co and containing at least Ni, Al, and Ca; and the carbon fiber may reduce the resistance of the secondary battery and may inhibit the lowering of the battery capacity with charge and discharge.

REFERENCE SINGS LIST

10 Non-aqueous electrolyte secondary battery
11 Positive electrode
12 Negative electrode
13 Separator
14 Electrode assembly
15 Battery case
16 Exterior housing can
17 Sealing assembly
18, 19 Insulating plate
20 Positive electrode tab
21 Negative electrode tab
22 Groove
23 Bottom plate
24 Lower vent member
25 Insulating member
26 Upper vent member
27 Cap
28 Gasket
30 Positive electrode current collector
31 Positive electrode mixture layer
40 Negative electrode current collector
41 Negative electrode mixture layer

The invention claimed is:

1. A positive electrode for a non-aqueous electrolyte secondary battery, comprising:
a positive electrode current collector; and
a positive electrode mixture layer formed on a surface of the positive electrode current collector, wherein
the positive electrode mixture layer includes at least: a positive electrode active material including a lithium-transition metal composite oxide; and a carbon fiber,
the lithium-transition metal composite oxide has a layered rock-salt structure, and contains substantially no Co and contains at least Ni, Al, and Ca,
a content of Co in the lithium-transition metal composite oxide is 0.01 mol % or less based on a total amount of metal elements excluding Li, and a content of Ca in the lithium-transition metal composite oxide is 0.5 mol % or less based on a total amount of metal elements excluding Li.

2. The positive electrode for a non-aqueous electrolyte secondary battery according to claim 1, wherein a content of the carbon fiber in the positive electrode mixture layer is 0.01 parts by mass to 1 part by mass based on 100 parts by mass of the positive electrode active material.

3. The positive electrode for a non-aqueous electrolyte secondary battery according to claim 1, wherein
the positive electrode mixture layer further includes a particulate conductive agent, and
a content of the particulate conductive agent in the positive electrode mixture layer is 3 parts by mass or less based on 100 parts by mass of the positive electrode active material.

4. The positive electrode for a non-aqueous electrolyte secondary battery according to claim 1, wherein a content of Ni in the lithium-transition metal composite oxide is 80 mol % or more based on a total amount of metal elements excluding Li.

5. The positive electrode for a non-aqueous electrolyte secondary battery according to claim 1, wherein the lithium-transition metal composite oxide further contains Mn.

6. The positive electrode for a non-aqueous electrolyte secondary battery according to claim 1, wherein the lithium-transition metal composite oxide further contains Nb.

7. A non-aqueous electrolyte secondary battery, comprising:
the positive electrode for a non-aqueous electrolyte secondary battery according to claim 1;
a negative electrode; and
a non-aqueous electrolyte.

8. The positive electrode for a non-aqueous electrolyte secondary battery according to claim 1, wherein the content of Co in the lithium-transition metal composite oxide is 0 mol % based on a total amount of metal elements excluding Li.

9. The positive electrode for a non-aqueous electrolyte secondary battery according to claim 1, wherein a crystallite diameter s of the lithium-transition metal composite oxide is $700 \text{ Å} \leq s \leq 950 \text{ Å}$.

10. The positive electrode for a non-aqueous electrolyte secondary battery according to claim 1, wherein a crystallite diameter s of the lithium-transition metal composite oxide is $774 \text{ Å} \leq s \leq 908 \text{ Å}$.

11. The positive electrode for a non-aqueous electrolyte secondary battery according to claim 1, wherein a fiber length of the carbon fiber is 1 μm to 10 μm.

12. The positive electrode for a non-aqueous electrolyte secondary battery according to claim 1, wherein a fiber length of the carbon fiber is 2 μm to 10 μm.

* * * * *